(12) United States Patent
Jobanputra et al.

(10) Patent No.: US 12,321,338 B2
(45) Date of Patent: *Jun. 3, 2025

(54) MECHANISMS FOR DEPLOYING DATABASE CLUSTERS

(71) Applicant: Salesforce, Inc., San Francisco, CA (US)

(72) Inventors: Varun Jobanputra, New York City, NY (US); Joshua Gruenberg, Bozeman, MT (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,790

(22) Filed: Jan. 19, 2024

(65) Prior Publication Data

US 2024/0193154 A1 Jun. 13, 2024

Related U.S. Application Data

(63) Continuation of application No. 17/491,102, filed on Sep. 30, 2021, now Pat. No. 11,914,580.

(51) Int. Cl.
*G06F 16/23* (2019.01)
*G06F 16/21* (2019.01)
*G06F 16/24* (2019.01)
*G06F 16/27* (2019.01)

(52) U.S. Cl.
CPC ............ *G06F 16/24* (2019.01); *G06F 16/213* (2019.01); *G06F 16/214* (2019.01); *G06F 16/219* (2019.01); *G06F 16/23* (2019.01); *G06F 16/27* (2019.01)

(58) Field of Classification Search
CPC ...... G06F 16/24; G06F 16/213; G06F 16/214; G06F 16/219; G06F 16/23; G06F 16/27
See application file for complete search history.

(56) References Cited

U.S. PATENT DOCUMENTS

| | | |
|---|---|---|
| 9,098,269 B2 | 8/2015 | Duffy et al. |
| 10,042,782 B2 | 8/2018 | Struttmann |
| 10,055,245 B1 | 8/2018 | Gupta et al. |
| 2008/0005182 A1 | 1/2008 | Gauthier et al. |
| 2008/0201701 A1 | 8/2008 | Hofhansl et al. |
| 2014/0067824 A1 | 3/2014 | DeLuca et al. |
| 2014/0095432 A1 | 4/2014 | Trumbull et al. |
| 2014/0114913 A1 | 4/2014 | Engelko et al. |
| 2014/0115176 A1 | 4/2014 | Kamboh et al. |

(Continued)

*Primary Examiner* — Alicia M Willoughby
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that pertain to deploying immutable instances of a system. A computer system may maintain an active generation value that indicates an immutable instance of a database system that is permitted to write data to a database. The computer system may deploy a first immutable instance of the database system and update the active generation value to permit the first immutable instance to write data to the database. The computer system may receive a request to deploy a second immutable instance of the database system that includes an update not found in the first immutable instance. The computer system may deploy the second immutable instance and update the active generation value to cause the first immutable instance to cease writing data to the database and to permit the second immutable instance to write data to the database.

20 Claims, 10 Drawing Sheets

(56) References Cited

U.S. PATENT DOCUMENTS

| | | |
|---|---|---|
| 2017/0034023 A1 | 2/2017 | Nickolov et al. |
| 2018/0373708 A1 | 12/2018 | Martin et al. |
| 2019/0042638 A1 | 2/2019 | Jujjuri et al. |
| 2019/0045007 A1 | 2/2019 | Wyatt et al. |
| 2020/0097498 A1 | 3/2020 | Tang et al. |
| 2020/0125662 A1 | 4/2020 | Zhu et al. |
| 2020/0301943 A1 | 9/2020 | Robinson et al. |
| 2021/0318998 A1 | 10/2021 | Filip et al. |
| 2021/0319115 A1 | 10/2021 | Kassouf et al. |
| 2023/0060733 A1 | 3/2023 | Arora et al. |

MECHANISMS FOR DEPLOYING DATABASE CLUSTERS

PRIORITY CLAIM

The present application is a continuation of U.S. application Ser. No. 17/491,102, entitled "Mechanisms for Deploying Database Clusters," filed Sep. 30, 2021, the disclosure of which is incorporated by reference herein in its entirety.

BACKGROUND

Technical Field

This disclosure relates generally to database systems and more specifically, to a process for deploying instances of a database system.

Description of the Related Art

Enterprises routinely implement database management systems (or, simply "database systems") that enable users to store a collection of information in an organized manner that can be efficiently accessed and manipulated. During operation, a database system receives requests from users via applications (e.g., an application server) or from other systems, such as another database system, to perform transactions. When performing a transaction, the database system often reads requested data from a database whose data is stored by a storage service and writes data back to the database. If the transaction includes a request for certain data, then the database system returns that data to the requestor in a response to the transaction request, assuming that the requested data is present in the database. For example, the database system might receive a request for certain employee records stored in the database. Accordingly, the database system accesses those records from the database and returns them to the requestor.

DETAILED DESCRIPTION

Figure 1:
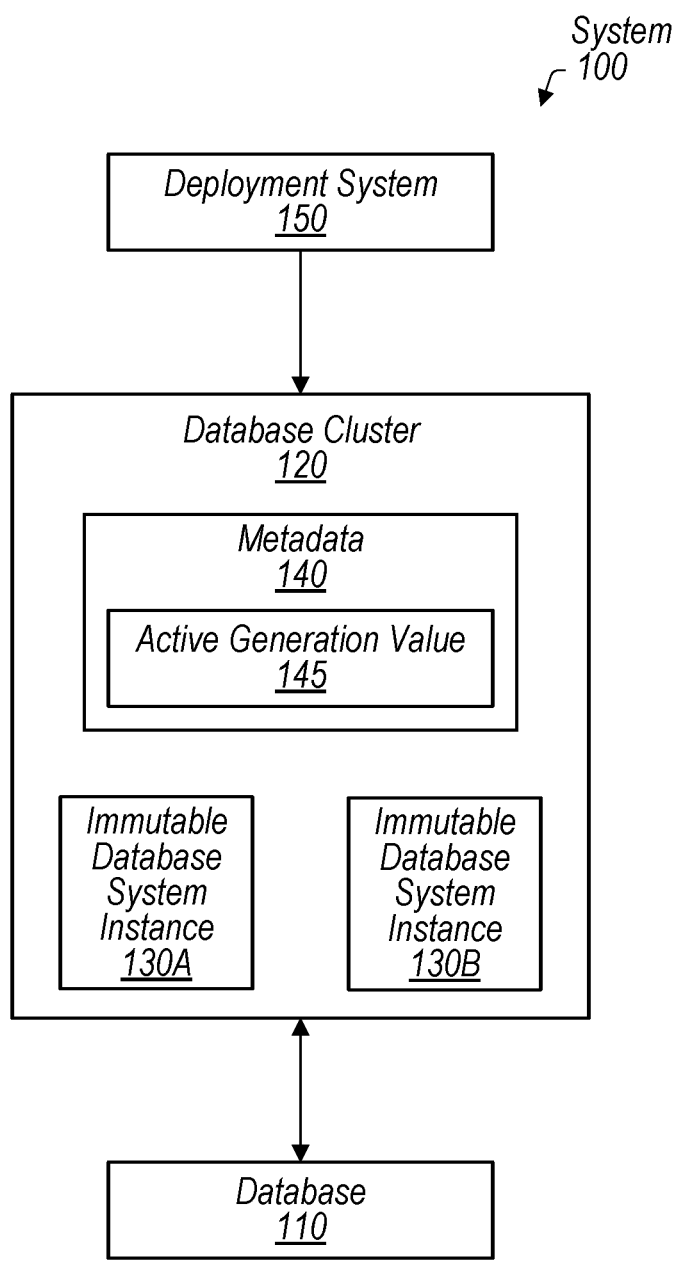
FIG. 1 is a block diagram illustrating example elements of a system that is capable of deploying instances of a database system, according to some embodiments.

A database system is routinely used to manage data, including accessing, manipulating, and storing that data.

Over time, updates are made in place to the database system in an attempt to improve its operational efficiency. In some cases, the updates are undocumented, impromptu changes to the configuration of the database system. As a result, the database system can suffer from configuration drift in which the database system increasingly diverges from the reviewed, approved, and originally-deployed configuration. This can lead to the database system having to be manually managed by hand, frequently updated and tweaked in place, leading to a unique environment. This unique environment, however, is typically not well-understood and thus can be difficult to replace or replicate if the database system has to be restarted or tested. In order to overcome some or all of these deficiencies, this present disclosure describes embodiments in which immutable instances of a database system are deployed.

As used herein, the term "immutable" when applied to an instance of a database system refers to an instance that once deployed, its operational nature cannot be changed. For example, once an immutable instance of the database system has been deployed, its configuration cannot be changed. While the operational nature of an immutable instance cannot be changed, the data and metadata that may be locally cached by the immutable instance can change over time. As a result of the immutableness of an immutable instance, in order to actualize an update to the database system, a new immutable instance with the update is deployed. The present disclosure addresses, among other things, the problem of how to deploy immutable instances of a database system and transition from a previous immutable instance to a new immutable instance without causing a pronounced slowdown to users.

In various embodiments described below, a system includes a deployment system and resources on which that deployment system can deploy a database and immutable instances of a database system capable of managing data stored in that database. The deployment system may receive a request to deploy an immutable instance of the database system to a database cluster. In response to receiving the request, in some embodiments, the deployment system determines whether the requested immutable instance is an initial deployment to the database cluster or an update deployment that includes an update of the database system. In some cases, the requested immutable instance is an initial deployment. As such, in various embodiments, the deployment system instantiates, using resources of the system, a database for storing data and a metadata store for storing an active generation value that can be used to indicate an immutable database system instance that is permitted to write data to the database on behalf of users of the system. The deployment system may then deploy the requested immutable database system instance and update the active generation value to permit that immutable instance to begin writing data to the database.

In some cases, the requested immutable instance is an update deployment that includes an update of the database system. As such, instead of deploying the database and the metadata store, in various embodiments, the deployment system prepares the database to be used by the new requested immutable database system instance. For example, the deployment system may generate a new database catalog by copying an existing database catalog used by the current immutable instance that is permitted to write data to the database and applying one or more changes. The deployment system may thereafter deploy the requested immutable instance to the same database cluster that includes the current immutable instance. When that immutable instance is deployed, in some embodiments, it operates in a standby mode in which it reads but does not write data for the database. While in that standby mode, the new immutable instance may be configured and tested to determine whether it is stable and capable of taking over the role of the current immutable instance. For example, the immutable instance may be tested to determine whether it is able to read data from the database in accordance with the new database catalog. If no issue is detected, then the deployment system may update the active generation value to cause the current immutable instance to shut down and the new immutable instance to start writing data to the database. If an issue is detected, then the new immutable instance may be destroyed and the active generation value is not updated, permitting the current immutable instance to continue to service requests to write data to the database.

These techniques may be advantageous over prior approaches for various reasons. The disclosed techniques use immutable instances and thus eliminate configuration drift in which a system is updated in place and over time diverges from its originally-deployed configuration into a unique configuration that might not be easily replicated. These techniques also allow for easier rollbacks when deploying a new immutable instance as the current immutable instance is not shut down until the new immutable instance is in a stable and ready state. Consequently, if an issue is detected in bringing up the new immutable instance, the system can continue with the current immutable instance (e.g., by not modifying the active generation value) and simply destroy the new immutable instance. These techniques also provide improved security through the use of immutable instances as an intruder who gains access to an immutable instance will be kicked out when a new immutable instance is deployed, whereas in the prior approaches, an intruder may maintain access while the system is updated over time. Moreover, the techniques may be applied to variety of updates to a system, including, but not limited to, major version upgrades, minor version upgrades, binary patches, emergency releases, configuration changes, sidecar container updates, AMI updates, instance type changes, etc. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software. In the illustrated embodiment, system 100 includes a database 110, a database cluster 120, and a deployment system 150. As further shown, database cluster 120 includes immutable database system instances 130A-B and metadata 140 defining an active generation value 145. In some embodiments, system 100 is implemented differently than illustrated. As an example, system 100 may include multiple database clusters 120 and/or metadata 140 may be dispersed across immutable instances 130A-B.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., database 110), and other entities of system 100. In various embodiments, system 100 is implemented using a cloud infrastructure that is provided by a cloud provider who may be different than an operator of system 100. Database 110, database cluster 120, and deployment system 150 may thus execute on and use the available cloud resources of the cloud infrastructure (e.g., computing resources, storage resources, network resources, etc.) in order to facilitate their operation. As an example, the database servers of an immutable database system instance 130 may execute within virtual environments hosted on server-based hardware included in a datacenter of the cloud provider. But in some embodiments, system 100 is implemented using a local or private infrastructure as opposed to a public cloud.

Database 110, in various embodiments, is a collection of information that is organized in a manner that allows for access, storage, and manipulation of that information. Accordingly, database 110 may include supporting software (e.g., storage servers that form a storage cluster) that allow for immutable database system instances 130 to carry out operations (e.g., accessing, storing, etc.) on the information stored at database 110. In various embodiments, database 110 is implemented using a single or multiple storage devices coupled together on a network (e.g., a storage attached network (SAN)) and configured to redundantly store information in order to prevent data loss. The storage devices may store data persistently and thus database 110 may serve as a persistent storage for system 100. Information that is written to database 110 by one database server may be accessible to other database servers of database cluster 120.

Database cluster 120, in various embodiments, is a set of database servers and metadata 140 for facilitating operation of those database servers. An immutable database system instance 130, in various embodiments, is a deployment of a database system that comprises one or more database servers. For example, an immutable database system instance 130 may include three database servers and thus, for the time period in which immutable instances 130A-B both exist, database cluster 120 includes six database servers. In some cases, an immutable instance 130 may include a different number of database servers than another immutable instance 130 in the same database cluster 120.

An immutable database system instance 130, in various embodiments, provides various database services (e.g., data storage, data retrieval, and data manipulation) to other components of system 100, such as an application server (not shown), or to components external to system 100. For example, an immutable database system instance 130 may receive a request from an application server to perform a transaction. A transaction, in various embodiments, is a logical unit of work (e.g., a specified set of database operations) to be performed in relation to database 110. For example, processing a transaction may include executing a SQL SELECT command to select one or more rows from one or more database tables of database 110. The contents of a row may be specified in a database record and thus the immutable database system instance 130 may return one or more records that correspond to the one or more table rows. Performing a transaction can include an immutable database system instance 130 writing database records to database 110. As explained in more detail with respect to FIG. 4A, one of the database servers of an immutable database system instance 130 may elected to be as an "active" database server that reads records from and write records to database 110, while the remaining database servers serve as "standby" database servers that can read but not write database records.

Metadata 140, in various embodiments, includes metadata that facilitates the operation of components of system 100, including immutable instances 130 and deployment system 150. As mentioned, in some embodiments, database records are written to files that are stored as a part of an LSM tree implemented at database 110. As such, metadata 140 may include location metadata that identifies the locations of files at database 110 and a keyspace defined by the records stored within a given file. When processing a transaction, an immutable database system instance 130 may use the location metadata of metadata 140 to locate requested database records. As shown, metadata 140 includes active generation value 145. In various embodiments, active generation value 145 is a value (e.g., an integer) that is observed by immutable database system instances 130 and can be modified by deployment system 150 to cause those immutable database system instances 130 to perform certain operations, as discussed in more detail below.

Deployment system 150, in various embodiments, facilitates the deployment of various components of system 100, including database 110 and immutable database system instances 130. As such, deployment system 150 may receive a request to deploy an immutable database system instance 130 on resources managed by deployment system 150. In response to receiving the request, in various embodiments, deployment system 150 executes a set of deploy pipelines that deploy the requested immutable database system instance 130. The set of pipelines that is executed may depend on whether the requested immutable database system instance 130 is the first deployment of a database system to database cluster 120 or a subsequent deployment. If it is the first deployment to database cluster 120, in various embodiments, deployment system 150 executes a set of pipelines that set up the database environment for the immutable instance 130 by instantiating database 110 and a metadata store for housing metadata 140. Thereafter, the set of pipelines instantiate the requested immutable instance 130 and configure it to interact with database 110. If the requested deployment is a subsequent deployment to database cluster 120, in various embodiments, deployment system 150 executes a set of pipelines that prepare the existing database environment (e.g., by creating a new database catalog) for the requested immutable instance 130 and then deploy the requested immutable instance 130.

While deploying a subsequent immutable instance 130, the current immutable instance 130 may continue to service requests to read and write data. For example, immutable database system instance 130A may be an initial deployment to database cluster 120. Later, deployment system 150 may receive a request to deploy immutable database system instance 130B, which may be an updated version of the database system corresponding to immutable instance 130A. While immutable instance 130B is being configured and tested so that it can replace immutable instance 130A, immutable instance 130A may continue to perform transactions for users such that the users do not experience degraded performance. If an issue is detected while deploying immutable instance 130B, then it can be destroyed without affecting the database performance of system 100. Once an immutable instance 130 is ready to take over the role of writing data to database 110 from the current immutable instance 130, in various embodiments, deployment system 150 updates active generation value 145 to permit the new immutable instance 130 to begin writing data to database 110. The current and new immutable instances 130 may observe the updated active generation value 145 and perform certain actions. In various embodiments, the current immutable instance 130 shuts down while the new immutable instance 130 elects a database server to write data to database 110. The use of active generation value 145 allows for a single event (updating the value) to be used to trigger the switchover between immutable instances 130. Because the switchover may be associated to that single event, a new immutable instance 130 may be instantiated, configured, tested, and destroyed before taking over (if there is an issue) without causing a disruption to the database services by system 100.

Figure 2:
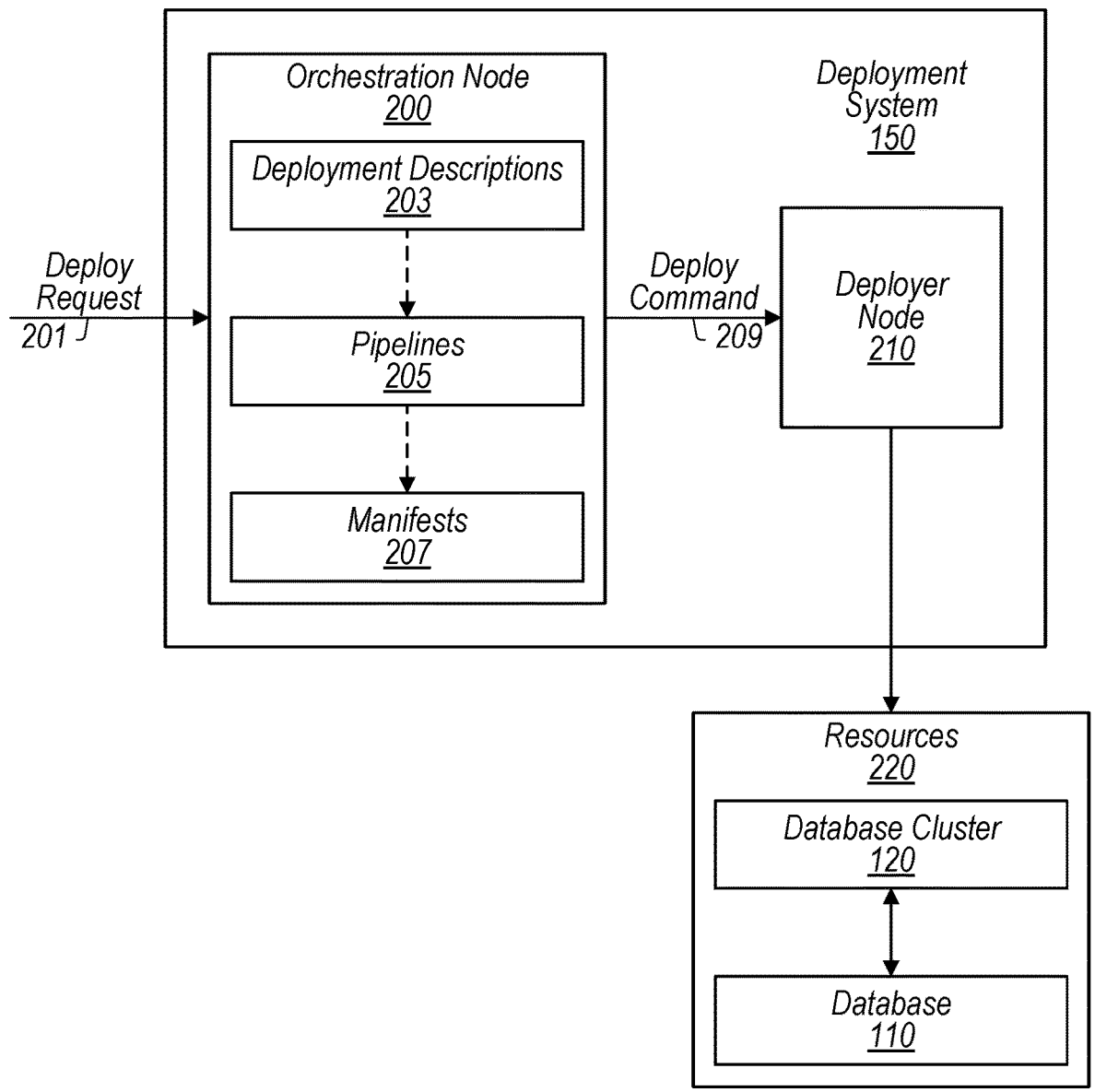
FIG. 2 is a block diagram illustrating example elements of a deployment system that is capable of deploying instances of a database system on resources managed by the deployment system, according to some embodiments.

Turning now to FIG. 2, a block diagram of an example deployment system 150 capable of deploying database 110 and database cluster 120 is depicted. In the illustrated embodiment, deployment system 150 includes an orchestration node 200 and a deployer node 210 coupled to resources 220 on which database 110 and database cluster 120 can be deployed. As further shown, orchestration node 200 includes a set of deployment descriptions 203, a set of pipelines 205, and a set of manifests 207. In some embodiments, deployment system 150 or resources 220 are implemented differently than shown. For example, orchestration node 200 might not include deployment descriptions 203.

Orchestration node 200, in various embodiments, is a set of software routines that are executable to facilitate the deployment of database 110 and database cluster 120. As illustrated, orchestration node 200 can receive a deploy request 201 to deploy a component onto resources 220. A deploy request 201 may be a request to deploy a major version upgrade of a database system, a minor version upgrade, a binary patch, an emergency release, a configuration change, a sidecar container update, an AMI update, or an instance type change. In some cases, a deploy request 201 includes deployment descriptions 203 describing the component to be deployed; in other cases, those deployment descriptions 203 are provided to orchestration node 200 as part of a different event, and the deploy request 201 triggers the use of those deployment descriptions 203. As a part of facilitating a deployment, orchestration node 200 may execute pipelines 205 that prepare, based on deployment descriptions 203, manifests 207 that can be used to instruct deployer node 210 on how components (e.g., database 110) are to be deployed on or removed from resources 220. A pipeline 205, in various embodiments, is a series of steps in which each step corresponds to a set of actions to be performed as a part of executing that step. After completing the set of actions for a step, orchestration node 200 may then proceed to the next sequential step of that pipeline 205. In various cases, if orchestration node 200 cannot complete an action of a step, it may jump to a later step (e.g., a cleanup step) in that pipeline 205, skipping one or more intermediate steps. In some cases, orchestration node 200 aborts execution of a pipeline 205 if a step cannot be completed. As discussed in greater detail with respect to FIG. 3, pipelines 205 may form a hierarchy in which the completion of a pipeline 205 may result in the execution of a subsequent pipeline 205 in that hierarchy.

As mentioned, pipelines 205 may be executed that prepare manifests 207 that are based on deployment descriptions 203. A deployment description 203, in some embodiment, is a set of files that describe a desired deployment of a component, such as an immutable instance 130. Those files may each correspond to a different subcomponent or service of the component that is to be deployed. A Helm chart is an example of a deployment description 203. In some cases, however, a deployment description 203 is not in a format that can be directly used by deployer node 210 to deploy the corresponding component. For example, a deployment description 203 may describe a hierarchy of elements to be deployed as a part of a component. Deployer node 210 may understand how to deploy those individual elements but lack an understanding of the hierarchy. As another example, a deployment description 203 may describe a component using a first structure or language while deployer node 210 is designed to understand only a second, different structure or language.

Deployment descriptions 203 may provide a more developer-friendly way to describe a component and its relationships with other components and thus may be used and provided to orchestration node 200. But in order to make use of those deployment descriptions 203, in various embodiments, orchestration node 200 executes pipelines 205 that include one or more steps for converting deployment descriptions 203 into manifests 207, as shown in FIG. 2 using dotted lines with arrows. Those manifests 207 may then be provided to deployer node 210 for deploying the corresponding components. In some embodiments, however, manifests 207 may be provided to orchestration node 200 by a user instead of deployment descriptions 203 and as such, pipelines 205 may not include conversion steps. After manifests 207 have been created, orchestration node 200 may then issue a deploy command 209 to deployer node 210 to deploy the appropriate component. A deploy command 209 may include the set of manifests 207 for the component or may specify a location from which the set of manifests 207 can be accessed by deployer node 210.

A manifest 207, in various embodiments, is a "record of intent" that describes a desired state of a component. As mentioned below, Kubernetes™ is an example of deployer node 210. Accordingly, in the context of Kubernetes™, manifests 207 may specify an object specification and an object status/state. The object specification specifies characteristics that define a desired state of the component being deployed. For example, a manifest 207 for an immutable instance 130 may include an object specification that specifies that the immutable instance 130 should include three database servers. The object status specifies the current state of a deployment of a manifest 207. Continuing with the previous example, the manifest 207 may include an object status that specifies that only two database servers have been deployed. During operation, in various embodiments, deployer node 210 monitors the current state defined by a manifest 207 and attempts to reconcile the current state to the desired state defined by that manifest 207 if there is a discrepancy. Returning again to the previous example, deployer node 210 may deploy a third database server to arrive at the three database servers.

Deployer node 210, in various embodiments, is a set of software routines executable to automate the deployment, scaling, and management of software programs. Kubernetes™ and Amazon Web Services™ are examples of deployer node 210. In the context of Kubernetes™, deployer node 210 provides a container-centric management environment for deploying and managing application containers that are portable, self-sufficient units that have an application and its dependencies. Accordingly, deployer node 210 may be used to instantiate database 110 and database cluster 120 on resources 220. In the Amazon Web Services™ context, deployer node 210 may provide a mechanism for deploying instances (or workloads) onto resources 220 that implement a cloud-based environment.

As part of managing resources 220 and deployments, in various embodiments, deployer node 210 maintains environment information about resources 220 and the configuration of the environment(s) managed by deployer node 210. Resources 220 can include, for example, a set of CPUs, storage devices, virtual machines, physical host machines, and network components (e.g., routers). Accordingly, the environment information might describe, for example, a set of host machines that make up a computer network, their compute resources (e.g., processing and memory capability), the software programs that are running on those machines, and the internal networks of each of those host machines. In various embodiments, deployer node 210 uses the environment information to deploy components of database 110 and database cluster 120 onto resources 220. For example, when deploying a database server, deployer node 210 may access the environment information and determine what resources are available and capable of being used to deploy a database server. Deployer node 210 may identify available resources 220 and then communicate with an agent node executing locally on resources 220 in order to instantiate the database server on the identified resources 220.

Figure 3:
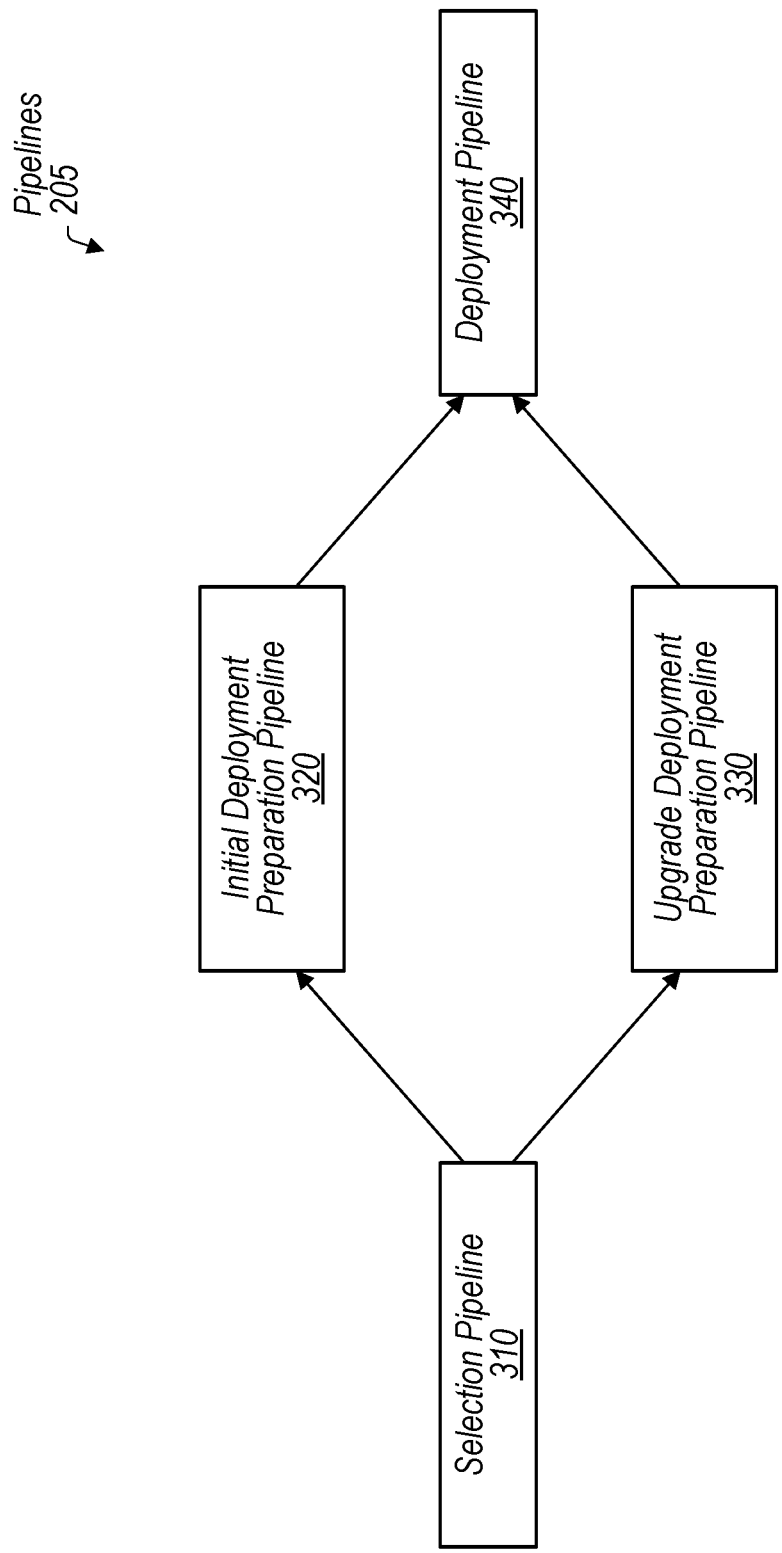
FIG. 3 is a block diagram illustrating example pipelines that are executable to facilitate the deployment of instances of a database system, according to some embodiments.

Turning now to FIG. 3, a block diagram of four example pipelines 205 is shown. In the illustrated embodiment, pipelines 205 include a selection pipeline 310, an initial deployment preparation pipeline 320, an upgrade deployment preparation pipeline 330, and a deployment pipeline 340. As shown, pipelines 205 form a path flow or hierarchy. In particular, the formed path flow starts with selection pipeline 310 and can flow from selection pipeline 310 to either initial deployment preparation pipeline 320 or upgrade deployment preparation pipeline 330. From either of those pipelines, the path flow continues to deployment pipeline 340 where the path flow may conclude. While not depicted, in some cases, after deployment pipeline 340 has been completed, the path flow may flow back to upgrade deployment preparation pipeline 330 (in the event that the path flow had flowed from pipeline 330 to pipeline 340) to allow for one or more remaining steps of upgrade deployment preparation pipeline 330 to be completed. The illustrated embodiment may be implemented differently than shown. For example, deployment pipeline 340 may not be a separate pipeline 205 but rather included in pipelines 320 and 330. As another example, there may be only a single pipeline 205 used for facilitating deployment of a component instead of multiple pipelines 205. As still another example, there may be a set of separate pipelines 205 for destroying artifacts and other components of database cluster 120, such as an immutable instance 130.

Selection pipeline 310, in various embodiments, is a set of steps for determining if the requested immutable instance deployment is an initial deployment or a subsequent deployment to database cluster 120 and for selecting either pipeline 320 or 330 for execution based on that determination. Selection pipeline 310 may be executed by orchestration node 200 in response to receiving a deploy request 201 to deploy an immutable instance 130. To determine whether the immutable instance deployment is an initial deployment, in various embodiments, selection pipeline 310 causes orchestration node 200 to check for the existence of a cluster identifier that may be stored in metadata 140. The cluster identifier may be created as part of executing initial deployment preparation pipeline 320 when deploying an initial immutable instance 130. If the cluster identifier is found, then selection pipeline 310 causes orchestration node 200 to execute upgrade deployment preparation pipeline 330. But if the cluster identifier does not exist, then selection pipeline 310 causes orchestration node 200 to execute initial deployment preparation pipeline 320.

Initial deployment preparation pipeline 320, in various embodiments, is a set of steps that facilitate deployment of an initial immutable instance 130 to database cluster 120. Before an initial immutable instance 130 is deployed to database cluster 120, in various embodiments, other components are deployed in preparation for the immutable instance 130. As an example, database 110 might not yet exist and thus may be deployed before that immutable instance 130 so that the immutable instance 130 can use database 110 to provide database services. As such, in various embodiments, initial deployment preparation pipeline 320 includes a set of steps for converting a deployment description 203 of database 110 into a manifest 207 and for issuing a deploy command 209 to deployer node 210 to deploy database 110 according to that manifest 207. Initial deployment preparation pipeline 320, in various embodiments, also includes a set of steps for creating the cluster identifier (mentioned above) and for storing as part of metadata 140. After database 110 has been deployed and the cluster identifier has been generated, initial deployment preparation pipeline 320 may cause orchestration node 200 to execute deployment pipeline 340.

Upgrade deployment preparation pipeline 330, in various embodiments, is a set of steps that facilitate subsequent deployments of immutable database system instances 130 to database cluster 120. When database 110 is instantiated, it may be instantiated to have a database catalog describing a set of database schemas. The database catalog may be constructed with the initial immutable instance 130 in mind so that it can be utilized by the initial immutable instance 130. Consequently, in various embodiments, upgrade deployment preparation pipeline 330 includes a set of steps for creating a new database catalog that can be used by the subsequently deployed immutable instance 130. That database catalog may be created based on the existing database catalog and may include one or more updates associated with the immutable instance 130 being deployed. To generate the new database catalog, in various embodiments, upgrade deployment preparation pipeline 330 causes orchestration node 200 to convert a deployment description 203 for generating a database catalog into a manifest 207. Orchestration node 200 may then issue a deploy command 209 with that manifest 207, and deployer node 210 may instantiate, based on that manifest 207, a worker job that creates the requested database catalog. After the catalog has been created, upgrade deployment preparation pipeline 330 may cause orchestration node 200 to execute deployment pipeline 340.

In some embodiments, after deployment pipeline 340 is completed, orchestration node 200 resumes execution of upgrade deployment preparation pipeline 330. The remaining steps of upgrade deployment preparation pipeline 330 may test the immutable instance 130, cause a switchover to the immutable instance 130, and perform a clean-up procedure. These steps are discussed in more detail with respect to FIGS. 4B and 4C. When performing each of those steps, orchestration node 200 may covert a deployment description 203 of the associated action (e.g., testing) into a manifest 207 and issue a deploy command 209 with that manifest 207 to deployer node 210. Deployer node 210 may then initiate, based on the received manifest 207, a worker job that performs the associated action.

Deployment pipeline 340, in various embodiments, is a set of steps for deploying an immutable instance 130 or another component (e.g., database 110). As mentioned, deployment pipeline 340 may be triggered as a result of executing either pipeline 320 or 330. In various embodiments, deployment pipeline 340 includes steps for converting one or more deployment descriptions 203 of an immutable instance 130 into one or more manifests 207 and for issuing a deploy command 209 with those manifests 207 to deployer node 210. In some cases, pipeline 320 or 330 may create the appropriate manifests 207 and deployment pipeline 340 may simply cause orchestration node 200 to issue a set of deploy commands 209 to provide those manifests 207 to deployer node 210 to instantiate the requested immutable instance 130 using resources 220. After the requested immutable instance 130 has been instantiated, deployment pipeline 340 may cause orchestration node 200 to resume execution of the pipeline (e.g., pipeline 320 or pipeline 330) that triggered execution of deployment pipeline 340.

Figure 4A:
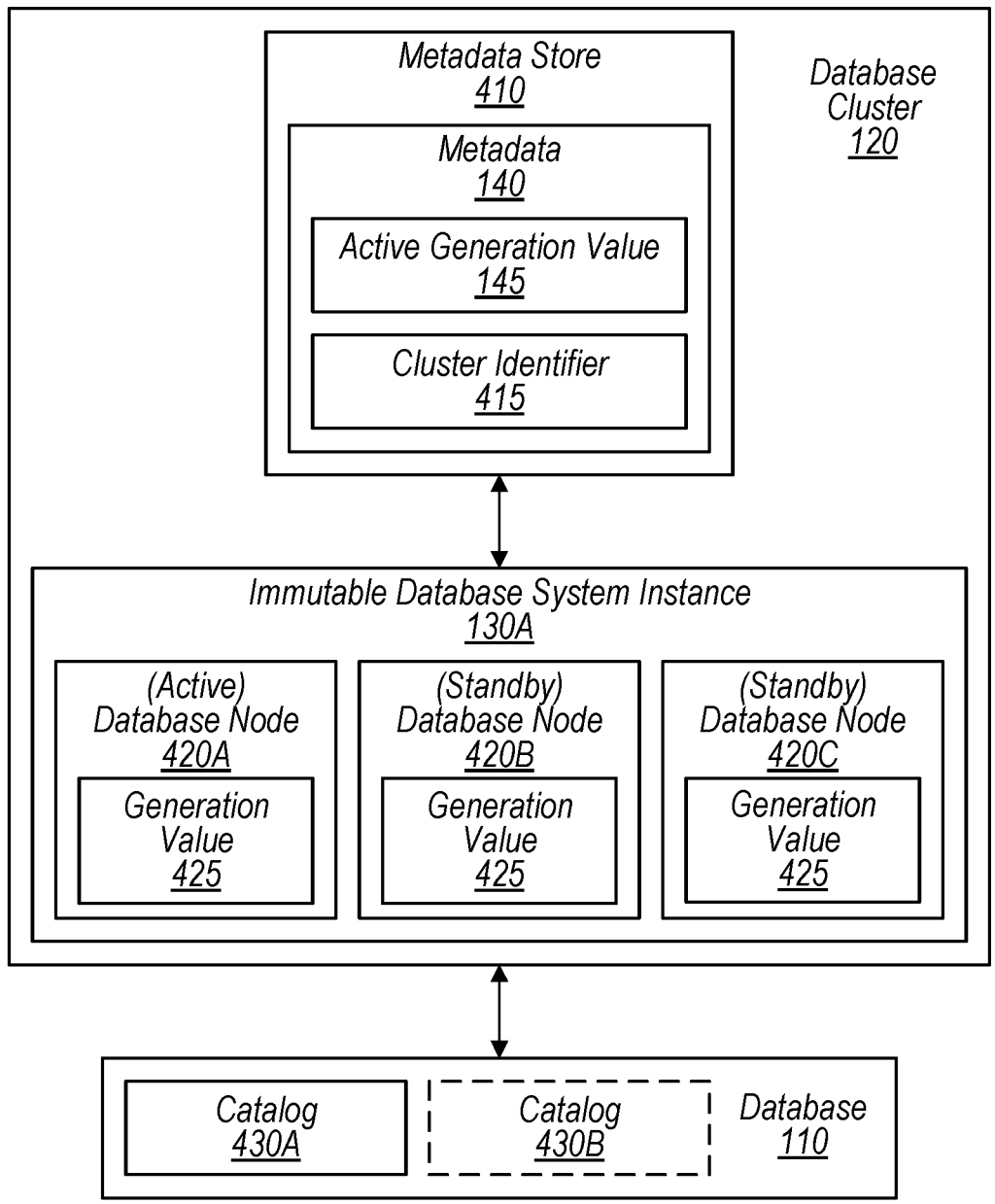
FIG. 4A-C are block diagrams illustrating example elements of an example deployment of an instance of a database system, according to some embodiments.
Figure 4B:
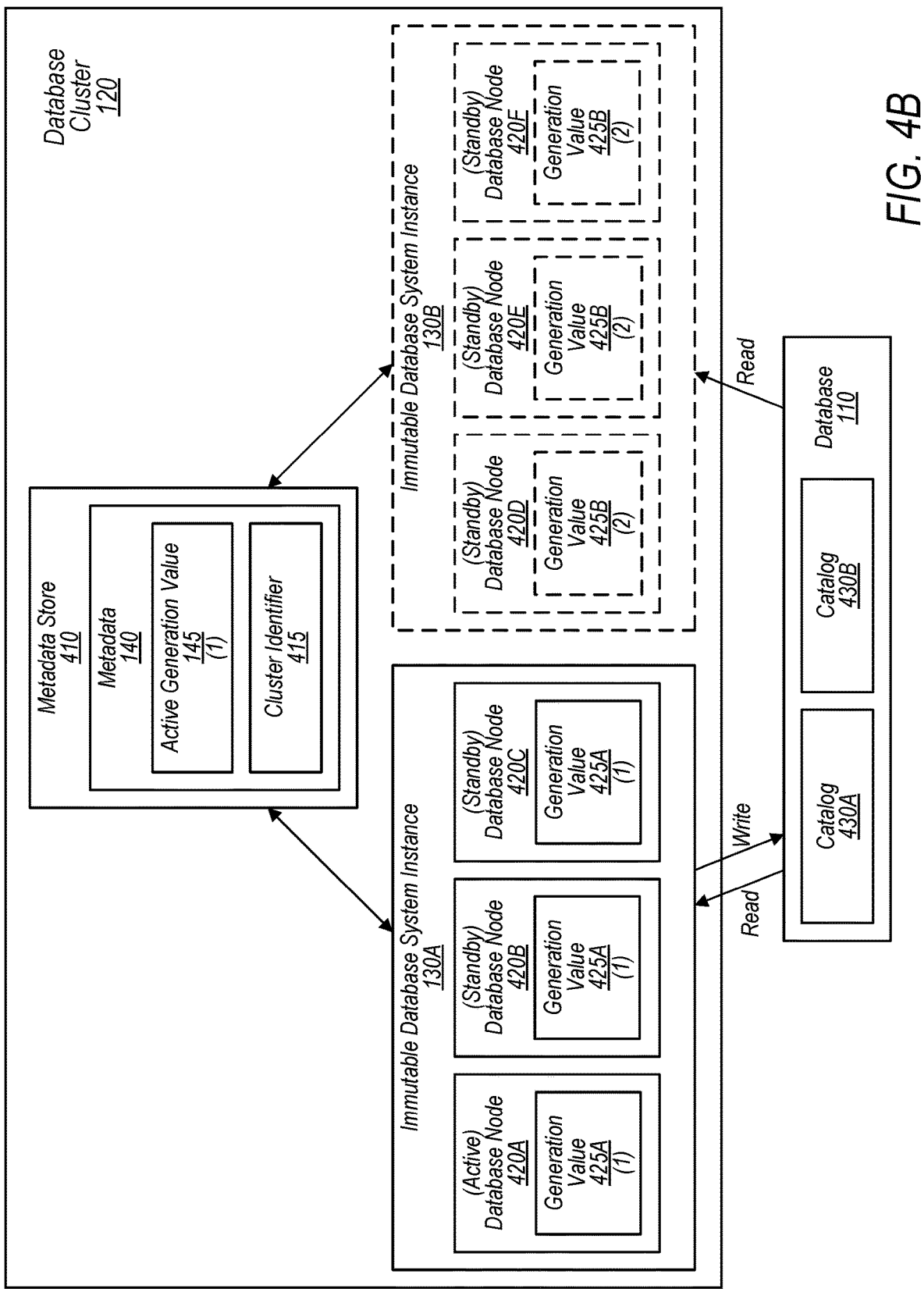
Figure 4C:
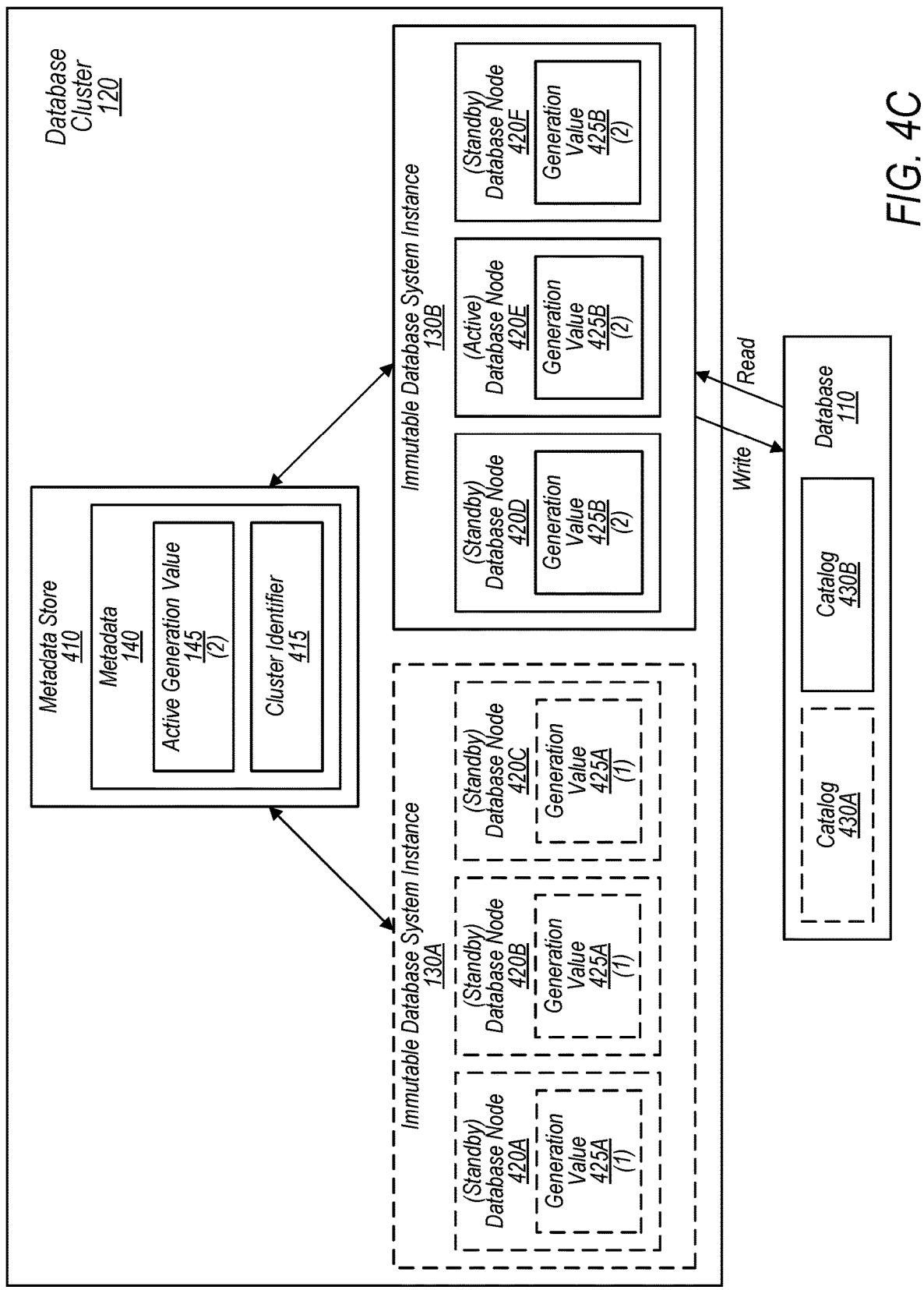

Turning now to FIG. 4A-C, block diagrams of an example deployment of an immutable database system instance 130 to database cluster 120 are shown. In the illustrated embodiment of FIG. 4A, there is a database 110 and a database cluster 120 having a metadata store 410 and an immutable database system instance 130A that was previously deployed to database cluster 120. As depicted, metadata store 410 includes metadata 140 having an active generation value 145 and a cluster identifier 415, and immutable database system instance 130A includes three database nodes 420A-C that are each associated with a generation value 425. Also as depicted, database 110 includes a catalog 430A and a catalog 430B that is being created. The illustrated embodiment may be implemented differently than shown. As an example, immutable instance 130A may include more or less database nodes 420.

Metadata store 410, in various embodiments, is a metadata repository used for storing various pieces of metadata that facilitate the operation of database cluster 120. Metadata store 410 may be implemented by a set of servers separate from, but accessible to, database nodes 420 and may be a shared repository. In various embodiments, metadata store 410 is initialized during the execution of initial deployment preparation pipeline 320 in which a manifest 207 is created and provided to deployer node 210 to deploy metadata store 410. While metadata 140 is stored at metadata store 410 in the illustrated embodiment, in some embodiments, metadata 140 may be stored in a distributed manner across database nodes 420.

As shown, metadata store 410 includes cluster identifier 415. Cluster identifier 415, in various embodiments, is a value that identifies database cluster 120 and may be used to deploy an immutable instance 130 to database cluster 120. When deploying a new immutable instance 130, a manifest 207 for the new immutable instance 130 may be created that includes the value of cluster identifier 415 in order to cause deployer node 210 to deploy that immutable instance 130 to database cluster 120 instead of another database cluster 120. As mentioned with respect to FIG. 3, cluster identifier 415 may be used to determine whether to execute initial deployment preparation pipeline 320 or upgrade deployment preparation pipeline 330 when deploying an immutable instance 130. In particular, in various embodiments, cluster identifier 415 is created when the first initial immutable instance 130 is deployed and thus its existence is used to trigger upgrade deployment preparation pipeline 330 when subsequent deployments are requested.

While not shown, metadata store 410 may store metadata that facilitates more efficient access of database 110. As an example, metadata store 410 may store location information that describes locations at database 110 where records may be found—e.g., the location information may identify a file and a key range defined by the records that are included in the file. In various embodiment, location information is stored by the database node 420 writing a file and it may be read by other database nodes 420 so they can update their local buffers to reflect the changes and to be able to service read requests. Metadata store 410 may also store metadata describing the users that are permitted to access database information, analytics about tenants associated with database cluster 120, etc.

A database node 420, in various embodiments, provides various database services (e.g., data storage, data retrieval, and data manipulation) to components of system 100. Accordingly, a database node 420 may receive a request to perform a transaction that might include reading and writing data for system 100. As a result, a database node 420 may interface with database 110 to access and/or store data and may use a catalog 430 to interpret that data being accessed from database 110. As illustrated, immutable database system instance 130 includes an active database node 420A and two standby database nodes 420B-C. In various embodiments, active database node 420A is permitted to read and write data for database 110 while standby database nodes 420B-C are permitted to read but not write data. Consequently, transactions that involve writing data to database 110 may be routed to and serviced at active database node 420A while transactions that do not involve writing may be serviced by any of database nodes 420A-C. In some embodiments, multiple database nodes 420 of an immutable instance 130 serve as active nodes and there may be no standby nodes. As described in more detail with respect to FIG. 4C, an election may be held between database nodes 420 to select one of them to become the active node.

As shown, database nodes 420A-C include a generation value 425. A generation value 425, in various embodiments, is a value (e.g., an integer) that is usable by a database node 420 to determine how that database node 420 should act when certain events occur. In particular, a database node 420 may be assigned a generation value 425 when it is deployed. The generation value 425 may be derived from active generation value 145—e.g., a generation value 425 may be the value of active generation value 145 (at the time of the database node 420's deployment) plus one. When active generation value 145 is updated (e.g., as part of deploying an immutable instance 130), in various embodiments, a database node 420 compares its generation value 425 against active generation value 145. If a database node's generation value 425 is greater than (or, in other implementations, less than) active generation 145, the database node's immutable instance 130 is in a standby mode in which that immutable instance's database nodes 420 can only serve as standby nodes. As a result, that immutable instance 130 is not permitted to write data to database 110. If the database node's generation value 425 is equal to active generation 145, then the database node's immutable instance 130 has been transitioned to an active mode in which the database nodes 420 of that immutable instance 130 may elect one or more of the database nodes 420 to be active nodes. As a result, that immutable instance 130 is permitted to write data to database 110. If the database node's generation value 425 is less than (or, greater than, in some implementations) active generation 145, the database node's immutable instance 130 is requested to shut down and thus its database node 420 may begin shutting down. As discussed in more detail with respect to FIG. 4C, the updating of active generation value 145 is an atomic event that can trigger a switcher over from a previously deployed immutable instance 130 to a newly deployed immutable instance 130.

A catalog 430, in various embodiments, is metadata having database schemas that may describe database tables, indexes, views, procedures, functions, and triggers. Consequently, a catalog 430 may be used by a database node 420 to access, interpret, and maintain data stored at database 110. In some embodiments, an immutable instance 130 is associated with a catalog 430 that its database nodes 420 use—e.g., catalog 430A may be used by database nodes 420A-C. In some cases, a catalog 430 used by one immutable instance 130 cannot be used by another immutable instance 130. Consequently, when deploying a new immutable instance 130, a new catalog 430 may be created for that new immutable instance 130. As mentioned, a catalog 430 may be created as part of executing upgrade deployment preparation pipeline 330 and thus the catalog 430 is created before the deployment of the new immutable instance 130. Accordingly, when deploying immutable database system instance 130B (illustrated in FIGS. 4B-C), catalog 430B may be created prior to the actual instantiation of immutable instance 130B as shown in FIG. 4A.

When creating catalog 430B, in various embodiments, the worker process instantiated by deployment system 150 (based on a manifest 207) blocks various database operations while catalog 430B created. For example, in various cases, catalog 430B is created based on catalog 430A (it may be a copy of catalog 430A with a set of applied changes) and thus data definition language (DDL) operations that could alter catalog 430A are blocked. Accordingly, immutable instance 130A is prevented from performing DDL operations. As another example, a catalog 430 may be created on each database 110 accessible to the immutable instance 130 that is being deployed and thus operations that create new databases 110 may be blocked. Workflows, such as creating a new snapshot or truncating a tenant, may be blocked. In various embodiments, blocking database operations involves the worker process modifying particular configurable parameters of system 100 to cause existing database nodes 420 to deny requests to execute the database operations. After catalog 430B has been created, the worker process may revert those changes such that those database operations are permitted again. As discussed further below, catalog 430A may be removed after immutable instance 130B has become the active instance.

Turning now to FIG. 4B, a block diagram of the deploying of immutable instance 130B to database cluster 120 is depicted. As shown, active generation value 145 has a value of "1" and the generation value 425A of immutable instance 130A also have a value of "1" while the generation value 425B of immutable instance 130B have a value of "2". As a result, immutable instance 130A is permitted to read and write data for database 110 while immutable instance 130B is permitted to only read data from database 110. Accordingly, immutable instance 130B includes only database nodes 420 serving as standby nodes. Prior to updating active generation value 145 to permit immutable instance 130B to write data to database 110, certain tasks may be performed to attempt to ensure that immutable instance 130B is ready to take over the role of immutable instance 130A.

In some embodiments, deployment system 150 deploys a worker process that performs a set of tests on immutable instance 130B. For example, the worker process may issue a request to immutable instance 130B to access particular data from database 110. If immutable instance 130B is unable to access that data, then immutable instance 130B may be destroyed as there is a problem, e.g., with catalog 430B or immutable instance 130B. Immutable instance 130A may also be tested to determine if it can access metadata 140 and/or communicate with application nodes of system 100. If the tests are not completed successfully, in various embodiments, the steps of pipelines 205 for instantiating an immutable instance 130 are skipped and the steps of pipelines 205 for cleaning up are executed in order to destroy that immutable instance 130 and its associated catalog 430.

In some embodiments, the caches (e.g., block cache, function cache, etc.) of immutable instance 130B are prepared. This may involve observing the information that is stored in caches of immutable instance 130A and then caching that information in caches of immutable instance 130B. In some cases, immutable instance 130B may operate for a period of time before active generation value 145 is updated so that immutable instance 130B can build up its caches, e.g., as part of processing requests to read data from database 110. In some embodiments, a subset of the caches of immutable instance 130B that are more pertinent to the operation of immutable instance 130B are prepared while the other caches are built up after immutable instance 130B has begun writing data to database 110.

After immutable instance 130B has been prepared to take over for immutable instance 130A, in various embodiments, deployment system 150 deploys a worker process (based on a manifest 207) to update active generation value 145 to cause the switchover. For the illustrated example, active generation value 145 is to be updated from having a value of "1" to a value of "2", matching the generation value 425B of immutable instance 130B. If there is an issue with deploying immutable instance 130B, then active generation value 145 is not updated and thus immutable instance 130A continues to write data to database 110.

Turning now to FIG. 4C. As depicted, active generation value 145 has been updated to have a value of "2". Immutable database system instances 130A and 130B observe the updated active generation value 145 and act accordingly. As mentioned, if the generation value 425 of an immutable instance 130 is less than active generation value 145 in some embodiments, then that immutable instance 130 begins to shut down. Thus, in the illustrated example, immutable instance 130A shuts down. In various embodiments, deployment system 150 deploys a worker process that removes artifacts (e.g., catalog 430A) associated with the operation of immutable instance 130A after immutable instance 130A has shut down. If the generation value 425 of an immutable instance 130 is equal to active generation value 145 in various embodiments, then the database nodes 420 of that immutable instance 130 may perform an election to select one of the database nodes 420 to be the active node. The active node might be selected based on a random selection scheme. In the illustrated example, database node 420E is selected to be the active node while database nodes 420D and 420F remain standby nodes. As a result, immutable instance 130B may begin servicing requests to write data to database 110.

After the switchover, an application node may receive error responses when it attempts to send transaction requests to immutable instance 130A as immutable instance 130A has shut down. In response to the errors, the application node may issue a request to metadata store 410 to access information (e.g., an IP address) identifying the new active immutable instance 130B that is permitted to write data. After obtaining the information, the application node may begin issuing its transaction requests to the immutable instance 130B. By implementing the hierarchy of pipelines 310-340 and using active generation value 145, in various embodiments, a variety of different updates (e.g., major version upgrades, minor version upgrade, binary patches, etc.) can be applied to the database system without causing a pronounced slowdown to users of that database system.

Figure 5:
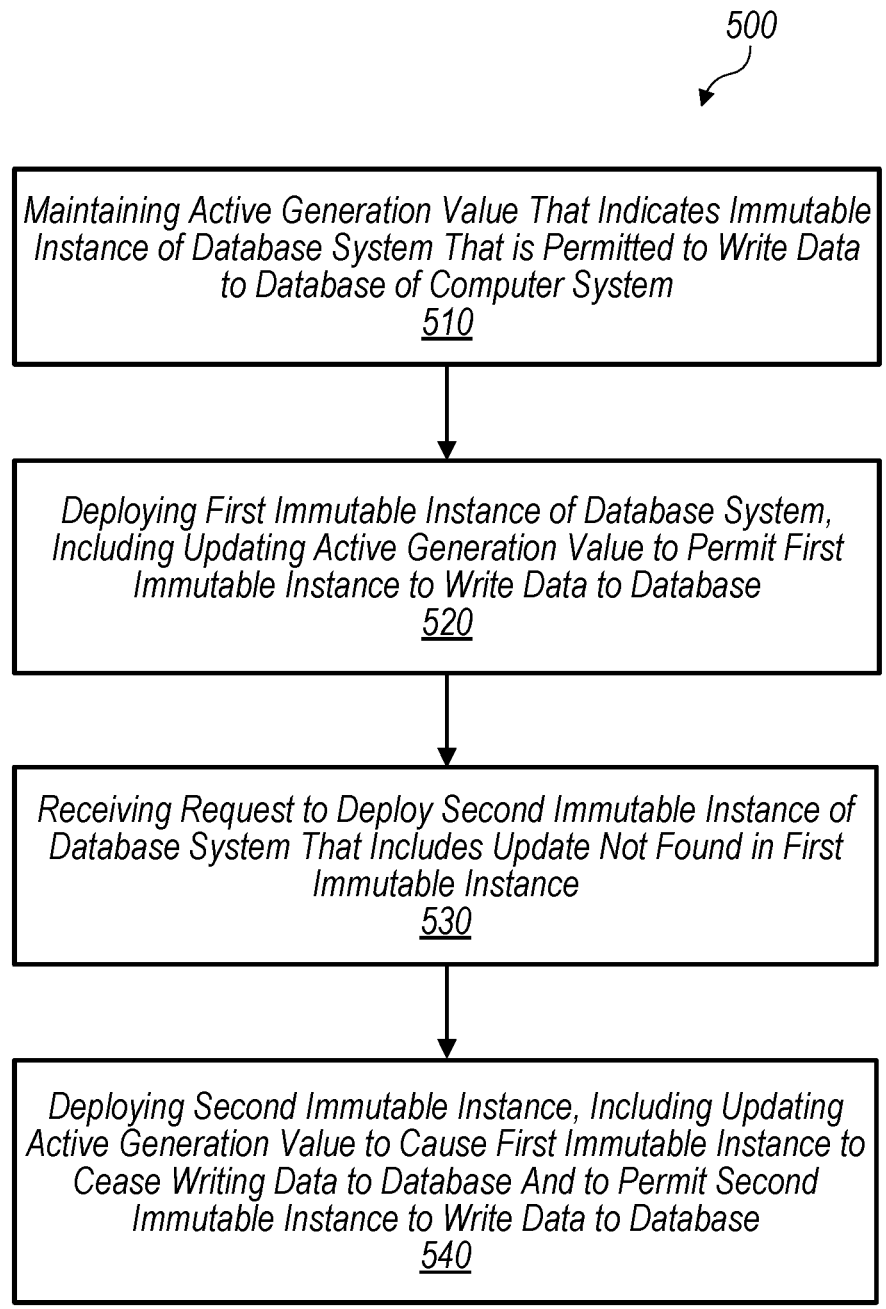
FIGS. 5 and 6 are flow diagrams illustrating example methods pertaining to deploying immutable instances of a database system, according to some embodiments.

Turning now to FIG. 5, a flow diagram of a method 500 is shown. Method 500 is one embodiment of a method performed by a computer system (e.g., system 100 or deployment system 150) to deploy immutable instances of a database system (e.g., immutable database system instances 130). Method 500 may be performed by executing program instructions that are stored on a non-transitory computer-readable medium. In some embodiments, method 500 includes more or less steps than shown. For example, method 500 may include a step in which an application server is informed of the deployment of an immutable instance of the database system.

Method 500 begins in step 510 with the computer system maintaining an active generation value (e.g., active generation value 145) that indicates an immutable instance of a database system that is permitted to write data to a database (e.g., database 110) associated with the computer system. In step 520, the computer system deploys a first immutable instance of the database system (e.g., immutable database system instance 130A), including updating the active generation value to permit the first immutable instance to write data to the database. The first immutable instance may include an active node (e.g., an active database node 420) and a set of standby nodes (e.g., standby database nodes 420). The active node is permitted to write data to the database and the set of standby nodes are permitted read but not write data for the database.

In step 530, the computer system receives a request (e.g., a deploy request 201) to deploy a second immutable instance of the database system (e.g., immutable database system instance 130B) that includes an update not found in the first immutable instance. The computer system may receive information (e.g., a set of deployment description 203) in a first format that describes the second immutable instance having the update. The first format may not be interpretable by a deployer node (e.g., deployer node 210). The computer system may convert the information from the first format into a second, different format that can be interpreted by the deployer node. As such, deploying the second immutable instance may include instructing the deployer node to instantiate, based on the converted information (e.g., a set of manifests 207), the second immutable instance using resources (e.g., resources 220) that are managed by the deployer node.

In step 540, the computer system deploys the second immutable instance, including updating the active generation value to cause the first immutable instance to cease writing data to the database and to permit the second immutable instance to write data to the database. In various cases, the nodes of the second immutable instance are instantiated as a set of standby nodes that are operable to perform, subsequent to the updating of the active generation value, an election to elect one of the set of nodes to transition from a standby node to an active node. Prior to updating the active generation value to permit the second immutable instance to write data to the database, the computer system causing data to be loaded into a set of caches of the second immutable instance based on a set of caches of the first immutable instance. In various cases, the first immutable instance shuts down in response to the active generation value being updated to permit the second immutable instance to write data to the database.

In various embodiments, the database is associated with a first catalog (e.g., a catalog 430) that includes a database schema. The computer system may create a second catalog such that the database is associated with the first and second catalogs. In various cases, the second catalog is derived from the first catalog and the update. The computer system may also block database operations from altering the first catalog while the second catalog is being created. Subsequent to updating the active generation value to cause the first immutable instance to cease writing data, the computer system may destroy the first catalog. In various cases, the computer system performs a test to determine whether the second immutable instance is able to read data from the database. The updating of the active generation value to permit the second immutable instance to write data to the database may be performed based on the test indicating that the second immutable instance is able to read data from the database. But in response to determining that the second immutable instance is not able to read data from the database, the computer system may destroy the second immutable instance.

In various embodiments, the first and second immutable instances are deployed to the same database cluster (e.g., a database cluster 120). The computer system may maintain a plurality of executable pipelines (e.g., pipelines 205) having steps that facilitate deployment of an immutable instance of the database system. In some embodiments, deploying the first immutable instance involves a first executable pipeline (e.g., initial deployment preparation pipeline 320) of the plurality of executable pipelines that facilitates deployment of an initial immutable instance of the database system to the database cluster. Deploying the second immutable instance may involve a second executable pipeline (e.g., upgrade deployment preparation pipeline 33) of the plurality of executable pipelines that facilitates deployment of an immutable instance of the database system to the database cluster that is an update to the initial immutable instance. The first executable pipeline may be operable to create a cluster identifier (e.g., a cluster identifier 415) in association with the first immutable instance. The computer system may execute a third executable pipeline (e.g., selection pipeline 310) of the plurality of executable pipelines that is operable to select for execution between the first and second executable pipelines based on whether the cluster identifier exists.

In response to receiving a request from an application node to identify a database node permitted to write data to the database, the computer system may provide, to the application node, a first address of a database node included in the first immutable instance. Subsequent to updating the active generation value to permit the second immutable instance to write data to the database, the computer system may receive another request from the application node to identify a database node permitted to write data to the database. The computer system may provide, to the application node, a second address of a database node included in the second immutable instance.

Figure 6:
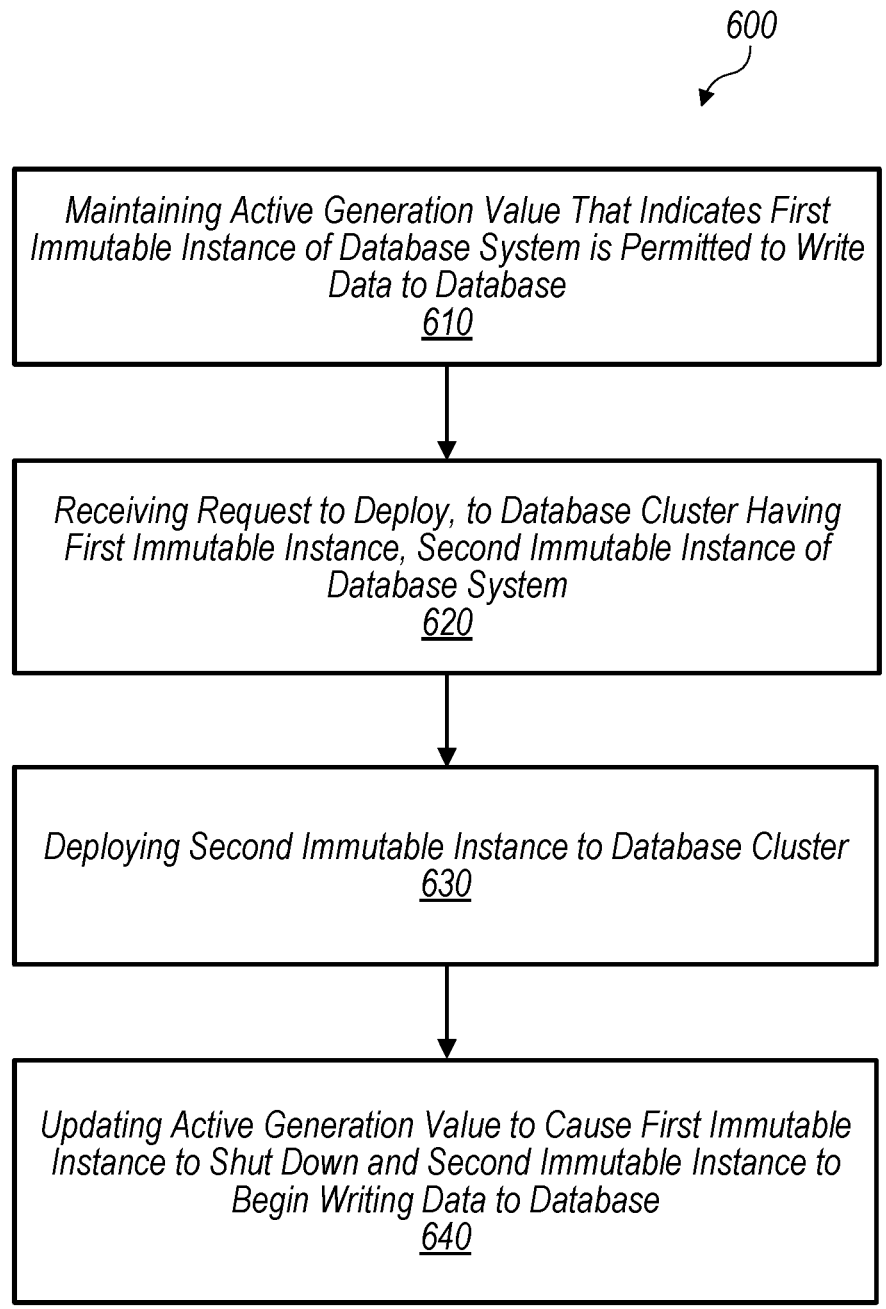

Turning now to FIG. 6, a flow diagram of a method 600 is shown. Method 600 is one embodiment of a method performed by a computer system (e.g., system 100 or deployment system 150) to deploy an immutable instance of a database system (e.g., an immutable database system instance 130). Method 600 may be performed by executing program instructions that are stored on a non-transitory computer-readable medium. In some embodiments, method 600 includes more or less steps than shown. For example, method 600 may include a step in which an application server is informed of the deployment of an immutable instance of the database system.

Method 600 begins in step 610 with the computer system maintaining an active generation value (e.g., active generation value 145) that indicates a first immutable instance of a database system (e.g., immutable database system instance 130A) is permitted to write data to a database (e.g., database 110). In step 620, the computer system receives a request (e.g., a deploy request 201) to deploy a second immutable instance of the database system (e.g., immutable database system instance 130B) to a database cluster (e.g., database cluster 120) that includes the first immutable instance.

In step 630, the computer system deploys the second immutable instance to the database cluster. The computer system may generate an updated database schema (e.g., catalog 430B) based on a database schema (e.g., catalog 430A) that is accessible to the first immutable instance. The updated database schema may not be accessible to the first immutable instance. Prior to updating the active generation value to cause the second immutable instance to begin writing data to the database, the computer system may perform a set of tests to ensure that the second immutable instance is able to access data of the database in accordance with the updated database schema. In various embodiments, deploying the first immutable instance includes the computer system executing a first pipeline (e.g., initial deployment preparation pipeline 320) having a set of steps that facilitate deployment of an initial immutable instance to the database cluster. Deploying the second immutable instance may include the computer system executing a second pipeline (e.g., upgrade deployment preparation pipeline 330) having a different set of steps that facilitate deployment of a subsequent immutable instance to the database cluster.

In step 640, the computer system updates the active generation value to cause the first immutable instance to shut down and the second immutable instance to begin writing data to the database. The updated active generation value indicates that the second immutable instance is permitted to write data to the database. In various cases, after updating the active generation value, the computer system deletes the database schema that is accessible to the first immutable instance.

Exemplary Multi-Tenant Database System

Figure 7:
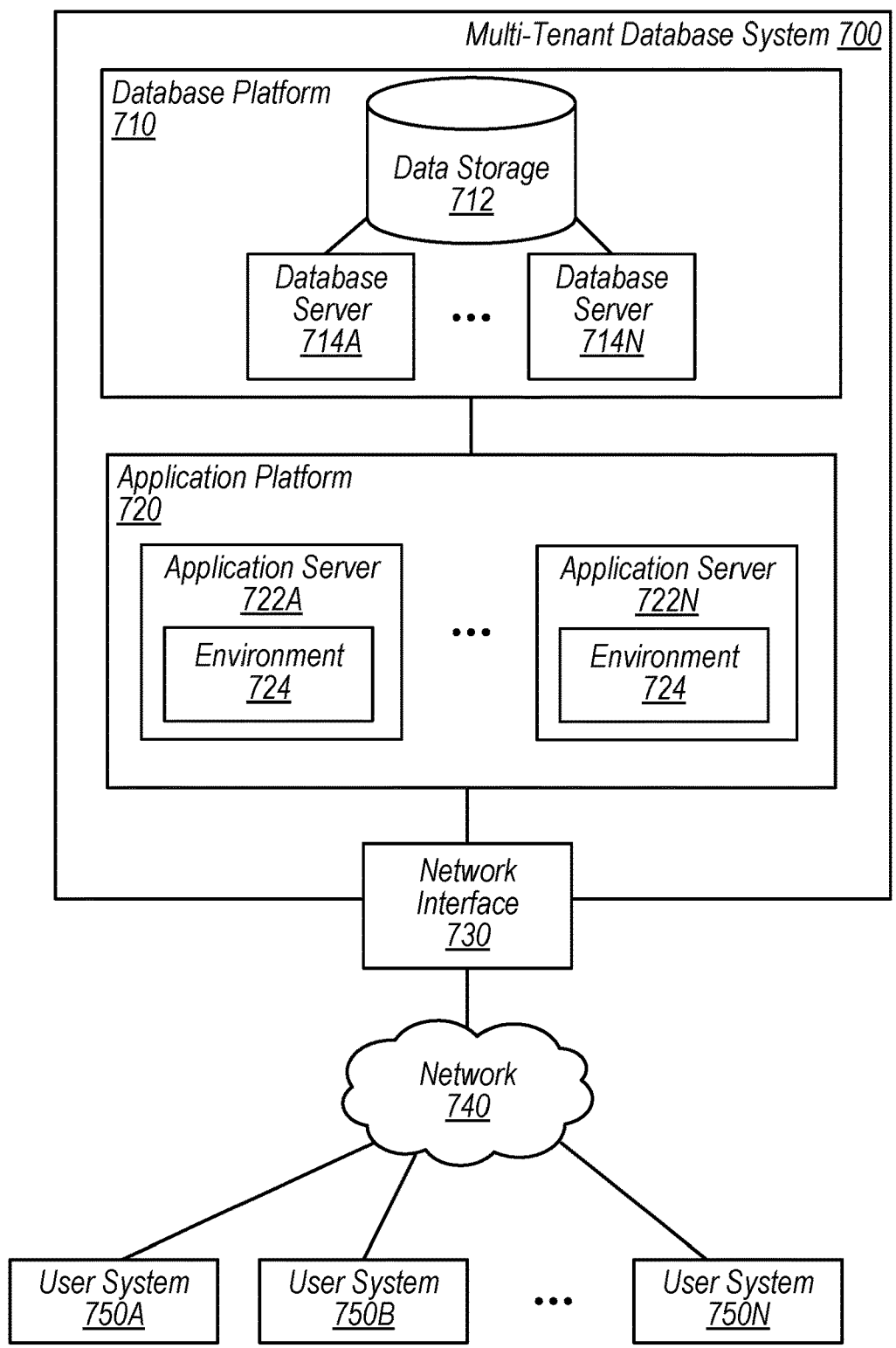
FIG. 7 is a block diagram illustrating elements of a multi-tenant system, according to some embodiments.

Turning now to FIG. 7, an exemplary multi-tenant database system (MTS) 700 in which various techniques of the present disclosure can be implemented is shown—e.g., system 100 may be MTS 700. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns.

Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database (e.g., database 110) comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 712 is organized as part of a log-structured merge-tree (LSM tree). An LSM tree normally includes two high-level components: an in-memory buffer and a persistent storage. In operation, a database server 714 may initially write database records into a local in-memory buffer before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 714, in various embodiments, are hardware elements, software routines, or a combination thereof capable of providing database services, such as data storage, data retrieval, and/or data manipulation. A database server 714 may correspond to database node 420. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree-database servers 714 maintain the LSM tree implemented on database platform 710. In some embodiments, database servers 714 implement a relational database management system (RDMS) or object oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined by one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
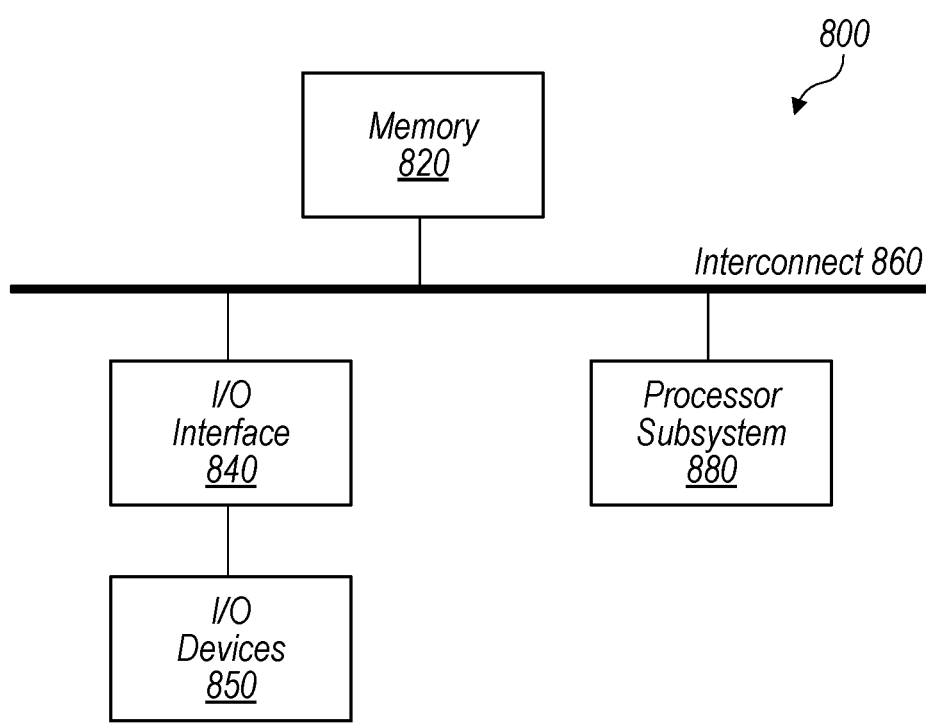
FIG. 8 is a block diagram illustrating elements of a computer system for implementing various systems described in the present disclosure, according to some embodiments.

Turning now to FIG. 8, a block diagram of an exemplary computer system 800, which may implement system 100, database 110, database cluster 120, deployment system 150, MTS 700, and/or user system 750, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, a set of program instructions that when executed implement immutable database system instance 130 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over Wi-Fi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s)

of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
   maintaining, by a computer system, an active generation value that is used to control which immutable instance of a set of servers is operating in an active mode;
   deploying, by the computer system, a first immutable instance of the set of servers, including:
   assigning a first generation value to the first immutable instance; and updating the active generation value to cause the first immutable instance to operate in the active mode based on the first generation value;
receiving, by the computer system, a request to deploy a second immutable instance of the set of servers that includes an update not found in the first immutable instance; and
deploying, by the computer system, the second immutable instance, including:
assigning a second generation value to the second immutable instance; and
updating the active generation value to:
cause the first immutable instance to shut down based on the first generation value; and
cause the second immutable instance to operate in the active mode based on the second generation value.

2. The method of claim 1, wherein the first and second immutable instances are deployed to a same cluster, and wherein the method further comprises:
maintaining, by the computer system, a plurality of pipelines having steps that facilitate deployment of an immutable instance of the set of servers,
wherein the deploying of the first immutable instance involves executing a first pipeline of the plurality of pipelines that facilitates deployment of an initial immutable instance of the set of servers to the cluster, and
wherein the deploying of the second immutable instance involves executing a second pipeline of the plurality of pipelines that facilitates deployment of an immutable instance of the set of servers to the cluster that is an update to the initial immutable instance.

3. The method of claim 2, wherein the first pipeline is operable to create a cluster identifier in association with the first immutable instance, wherein the method further comprises:
executing, by the computer system, a third pipeline of the plurality of pipelines that is operable to select for execution between the first and second pipelines based on whether the cluster identifier exists.

4. The method of claim 1, wherein the deploying of the second immutable instance includes:
performing a test to determine whether the second immutable instance is capable of taking over a role of the first immutable instance, wherein the updating of the active generation value to cause the second immutable instance to operate in the active mode is performed based on the test indicating that the second immutable instance is capable of taking over a role of the first immutable instance.

5. The method of claim 1, further comprising:
before the updating of the active generation value to cause the second immutable instance to operate in the active mode, the computer system causing data to be loaded into a set of caches of the second immutable instance based on a set of caches of the first immutable instance.

6. The method of claim 1, further comprising:
before the updating of the active generation value to cause the second immutable instance to operate in the active mode and in response to receiving a request from an application server to identify a server that is capable of processing requests from the application server, the computer system providing, to the application server, an address of a server included in the first immutable instance; and
after the updating of the active generation value to cause the second immutable instance to operate in the active mode and in response to receiving another request from the application server to identify a server capable of processing requests from the application server, the computer system providing, to the application server, an address of a server included in the second immutable instance.

7. The method of claim 1, wherein the set of servers is a set of database servers, and wherein the second immutable instance is permitted to write data to a database of the computer system in the active mode.

8. The method of claim 7, wherein the deploying of the second immutable instance includes:
instantiating the second immutable instance as a set of standby database servers operable to perform, after the updating of the active generation value to cause the second immutable instance to operate in the active mode, an election to elect one of the set of standby database servers to transition to an active database server.

9. The method of claim 7, wherein the database is associated with a first catalog that includes a database schema, and wherein the method further includes:
creating, by the computer system, a second catalog that is derived from the first catalog and the update, wherein the database is associated with the first and second catalogs; and
after the updating of the active generation value to cause the second immutable instance to operate in the active mode, the computer system destroying the first catalog.

10. The method of claim 1, further comprising:
receiving information in a first format that describes the second immutable instance having the update, wherein the first format cannot be interpreted by a deployer node; and
converting the information from the first format into a second format that can be interpreted by the deployer node, wherein the deploying of the second immutable instance includes instructing the deployer node to instantiate, based on the converted information, the second immutable instance using resources managed by the deployer node.

11. A non-transitory computer-readable medium having program instructions stored thereon that are capable of causing a computer system to perform operations comprising:
maintaining an active generation value that is used to control which immutable instance of a set of servers is operating in an active mode;
deploying a first immutable instance of the set of servers, including:
assigning a first generation value to the first immutable instance; and
updating the active generation value to cause the first immutable instance to operate in the active mode based on the first generation value;
receiving a request to deploy a second immutable instance of the set of servers that includes an update not found in the first immutable instance; and
deploying the second immutable instance, including:
assigning a second generation value to the second immutable instance; and
updating the active generation value to:
cause the first immutable instance to shut down based on the first generation value; and
cause the second immutable instance to operate in the active mode based on the second generation value.

12. The non-transitory computer-readable medium of claim 11, wherein the deploying of the first immutable instance includes executing a first pipeline having a set of steps that facilitate deployment of an initial immutable instance to an environment, and wherein the deploying of the second immutable instance includes executing a second pipeline having a different set of steps that facilitate deployment of a subsequent immutable instance to the environment.

13. The non-transitory computer-readable medium of claim 11, wherein the deploying of the second immutable instance includes:
performing a test to determine whether the second immutable instance is capable of taking over a role of the first immutable instance, wherein the updating of the active generation value to cause the second immutable instance to operate in the active mode is performed based on the test indicating that the second immutable instance is capable of taking over a role of the first immutable instance.

14. The non-transitory computer-readable medium of claim 11, wherein the set of servers is a set of database servers, and wherein the second immutable instance is permitted to write data to a database of the computer system in the active mode.

15. The non-transitory computer-readable medium of claim 14, wherein the operations further comprise:
creating a first database schema through which the first immutable instance accesses data from the database;
creating a second database schema through which the second immutable instance accesses data from the database; and
performing one or more post-deployment operations that include deleting the first database schema or the second database schema based on a version of an active database server of a database cluster associated with the first and second immutable instances.

16. A system, comprising:
at least one processor; and
memory having program instructions stored thereon that are executable by the at least one processor to cause the system to perform operations comprising:
maintaining an active generation value that is used to control which immutable instance of a set of servers is operating in an active mode;
deploying a first immutable instance of the set of servers, including:
assigning a first generation value to the first immutable instance; and
updating the active generation value to cause the first immutable instance to operate in the active mode based on the first generation value;
receiving a request to deploy a second immutable instance of the set of servers that includes an update not found in the first immutable instance; and
deploying the second immutable instance, including:
assigning a second generation value to the second immutable instance; and
updating the active generation value to:
cause the first immutable instance to shut down based on the first generation value; and
cause the second immutable instance to operate in the active mode based on the second generation value.

17. The system of claim 16, wherein the deploying of the first immutable instance includes executing a first pipeline having a set of steps that facilitate deployment of an initial immutable instance to an environment, and wherein the deploying of the second immutable instance includes executing a second pipeline having a different set of steps that facilitate deployment of a subsequent immutable instance to the environment.

18. The system of claim 16, wherein the deploying of the second immutable instance includes:
performing a test to determine whether the second immutable instance is capable of taking over a role of the first immutable instance, wherein the updating of the active generation value to cause the second immutable instance to operate in the active mode is performed based on the test indicating that the second immutable instance is capable of taking over a role of the first immutable instance.

19. The system of claim 16, wherein the deploying of the second immutable instance includes:
before the updating of the active generation value to cause the second immutable instance to operate in the active mode, causing data to be loaded into a set of caches of the second immutable instance based on a set of caches of the first immutable instance.

20. The system of claim 16, wherein the set of servers is a set of database servers, and wherein the second immutable instance is permitted to write data to a database in the active mode.

* * * * *